United States Patent [19]

Zuber et al.

[11] Patent Number: 6,029,110
[45] Date of Patent: Feb. 22, 2000

[54] METHOD AND APPARATUS FOR PROVIDING PASSENGER ACCESS TO A VEHICLE NAVIGATION SYSTEM

[75] Inventors: Gary Zuber, Santa Clara; Hidekazu Oshizawa, Cupertino, both of Calif.

[73] Assignee: Visteon Technologies, LLC, Dearborn, Mich.

[21] Appl. No.: 08/720,507

[22] Filed: Sep. 30, 1996

[51] Int. Cl.[7] .................................................. G06F 165/00
[52] U.S. Cl. ................................. 701/200; 701/1; 701/36
[58] Field of Search ................................. 701/1, 36, 200; 73/178 R; 340/988, 990, 995

[56] References Cited

U.S. PATENT DOCUMENTS

| | | |
|---|---|---|
| 3,845,289 | 10/1974 | French . |
| 4,570,227 | 2/1986 | Tachi et al. . |
| 4,608,656 | 8/1986 | Tanaka et al. . |
| 4,611,293 | 9/1986 | Hatch et al. . |
| 4,672,565 | 6/1987 | Kuno et al. . |
| 4,673,878 | 6/1987 | Tsushima et al. . |
| 4,723,218 | 2/1988 | Hasebe et al. . |
| 4,734,863 | 3/1988 | Honey et al. . |
| 4,751,512 | 6/1988 | Longaker . |
| 4,782,447 | 11/1988 | Ueno et al. . |
| 4,796,191 | 1/1989 | Honey et al. . |
| 4,797,841 | 1/1989 | Hatch . |
| 4,831,563 | 5/1989 | Ando et al. . |
| 4,862,398 | 8/1989 | Shimizu et al. . |
| 4,914,605 | 4/1990 | Loughmiller Jr. et al. . |
| 4,918,609 | 4/1990 | Yamawaki . |
| 4,926,336 | 5/1990 | Yamada . |
| 4,937,753 | 6/1990 | Yamada . |
| 4,964,052 | 10/1990 | Ohe . |
| 4,970,652 | 11/1990 | Nagashima . |
| 4,982,332 | 1/1991 | Saito et al. . |
| 4,984,168 | 1/1991 | Neukrichner et al. . |
| 4,989,151 | 1/1991 | Nuimura . |
| 4,992,947 | 2/1991 | Nuimura et al. . |
| 4,996,645 | 2/1991 | Schneyderberg Van der Zon . |
| 4,999,783 | 3/1991 | Tenmoku et al. . |
| 5,040,122 | 8/1991 | Neukirchner et al. . |
| 5,046,011 | 9/1991 | Kakihara et al. . |
| 5,060,162 | 10/1991 | Ueyama et al. . |
| 5,177,685 | 1/1993 | Davis et al. . |
| 5,283,743 | 2/1994 | Odagawa . |
| 5,287,297 | 2/1994 | Ihara et al. . |
| 5,297,050 | 3/1994 | Ichimura et al. . |
| 5,471,389 | 11/1995 | Hahlganss ................................. 701/36 |
| 5,510,983 | 4/1996 | Lino ........................................... 701/1 |
| 5,764,139 | 6/1998 | Nojima et al. ............................. 701/1 |
| 5,794,164 | 8/1998 | Beckert et al. .......................... 701/36 |

FOREIGN PATENT DOCUMENTS

| | | | |
|---|---|---|---|
| 4243511A1 | 12/1992 | Germany | ...................... G08G 1/0962 |
| 4301160A1 | 1/1993 | Germany | ....................... B60R 16/02 |

OTHER PUBLICATIONS

French, R.L., "MAP Matching Origins Approaches and Applications" Robert L. French & Associates, 3815 Lisbon St., Suite 201, Fort Worth, TX 76107, USA, pp. 91–116.

*Primary Examiner*—Gary Chin
*Attorney, Agent, or Firm*—Joseph M. Villeneuve; Beyer & Weaver

[57] ABSTRACT

A method and apparatus provide access to an interactive product to a passenger of a vehicle while limiting access to the interactive product to the driver of the vehicle. At least one control device is provided for allowing user interaction with the interactive product. Interaction with the interactive product via the at least one control device is inhibited while the vehicle is moving. An access device is provided which must be employed in conjunction with the at least one control device to enable user interaction with the interactive product while the vehicle is moving.

10 Claims, 3 Drawing Sheets

METHOD AND APPARATUS FOR PROVIDING PASSENGER ACCESS TO A VEHICLE NAVIGATION SYSTEM

BACKGROUND OF THE INVENTION

The present invention relates to user access to a vehicle navigation system. More specifically, the present invention relates to methods and apparatus for providing passenger access to a vehicle navigation system while the vehicle is moving without defeating the purpose of "lock out" features intended to control driver access to the system.

Because a vehicle navigation system, especially one with a video screen, has the potential to distract the driver, the incorporation of a software "lock out" feature which prevents the driver from accessing the system while the vehicle is moving has been discussed within the industry. This avoids hazardous situations in which driver inattention can have disastrous consequences. It may also serve to protect manufacturers of such systems from potential liability. Unfortunately, the incorporation of such a feature means that if the driver requires access to the system, she must bring the vehicle to a complete stop. Such a situation might occur where, for example, the driver accidentally strays from the route, or encounters an emergency condition which necessitates deviation from the route and/or calculation of a new route. Having to stop the vehicle to gain access to the navigation system is not only inconvenient, but may itself expose the driver and any passengers to other forms of risk.

In addition to preventing the driver from using the navigation system while the vehicle is moving, currently available "lock out" features also deny system access to passengers, even where passenger access would not cause the kind of hazardous conditions the "lock out" feature was designed to avoid. Thus, even though a passenger could safely operate the vehicle navigation system to calculate an alternate route or to find the way back to an original route, current "lock out" features are not flexible enough to allow such use while the vehicle is moving.

It is therefore desirable to provide a vehicle navigation system in which a passenger, but not the driver, can gain access to the system while the vehicle is moving.

SUMMARY OF THE INVENTION

The present invention provides a vehicle navigation system with features which allow a passenger to circumvent the "lock out" feature without undermining the purpose behind the "lock out" feature. The invention provides an access device with which the passenger may gain access to the system while the vehicle is moving. The access device is difficult, if not impossible, for the driver of the vehicle to use. According to one embodiment, the access device is a button or switch which is provided within the vehicle and is remote from the system. The device is located so that the passenger has easy access to it. However, its location is such that it is substantially inaccessible to the driver.

According to another embodiment, the access device is a button or switch which is integrated into the system in such a way that it is fairly simple for the passenger to use, but difficult or impossible for the driver to use. For example, in some embodiments where the access device comprises a button, it must be continuously depressed (i.e., activated) for the system keypad to be used. Thus, some embodiments require two hands to operate the system, making it much more difficult for the driver to use than the passenger.

According to one embodiment, the access device is a sensor which senses whether a passenger is seated in the passenger seat. If a passenger is in the seat, user interaction with the system is enabled. If not, the "lock out" feature is employed. In a more specific embodiment, the sensor determines not only whether there is a passenger in the seat, but whether the passenger is wearing her seat belt. Such embodiments may make use of existing seat belt sensing electronics.

According to another embodiment, the access device is a hand held remote control device with which the passenger may interact with the system.

Thus, according to the present invention, a method and apparatus provide access to an interactive product to a passenger of a vehicle while limiting access to the interactive product to the driver of the vehicle. At least one control device is provided for allowing user interaction with the interactive product. Interaction with the interactive product via the at least one control device is inhibited while the vehicle is moving. An access device is provided which must be employed in conjunction with the at least one control device to enable user interaction with the interactive product while the vehicle is moving. Interaction with the interactive product via the at least one control device is allowed while the vehicle is moving in response to activation of this access device.

A further understanding of the nature and advantages of the present invention may be realized by reference to the remaining portions of the specification and the drawings.

DESCRIPTION OF THE PREFERRED EMBODIMENT

The present invention relates generally to commonly assigned U.S. Pat. No. 5,345,382 to Kao for CALIBRATION METHOD FOR A RELATIVE HEADING SENSOR, U.S. Pat. No. 5,359,529 to Snider for ROUTE GUIDANCE ON/OFF-ROUTE STATE FILTER, U.S. Pat. No. 5,374,933 to Kao for POSITION CORRECTION METHOD FOR VEHICLE NAVIGATION SYSTEM, and U.S. Pat. No. 5,515,283 to Desai et al. for METHOD FOR IDENTIFYING HIGHWAY ACCESS RAMPS FOR ROUTE CALCULATION IN A VEHICLE NAVIGATION SYSTEM, the entire specifications of which are incorporated herein by reference.

Figure 1:
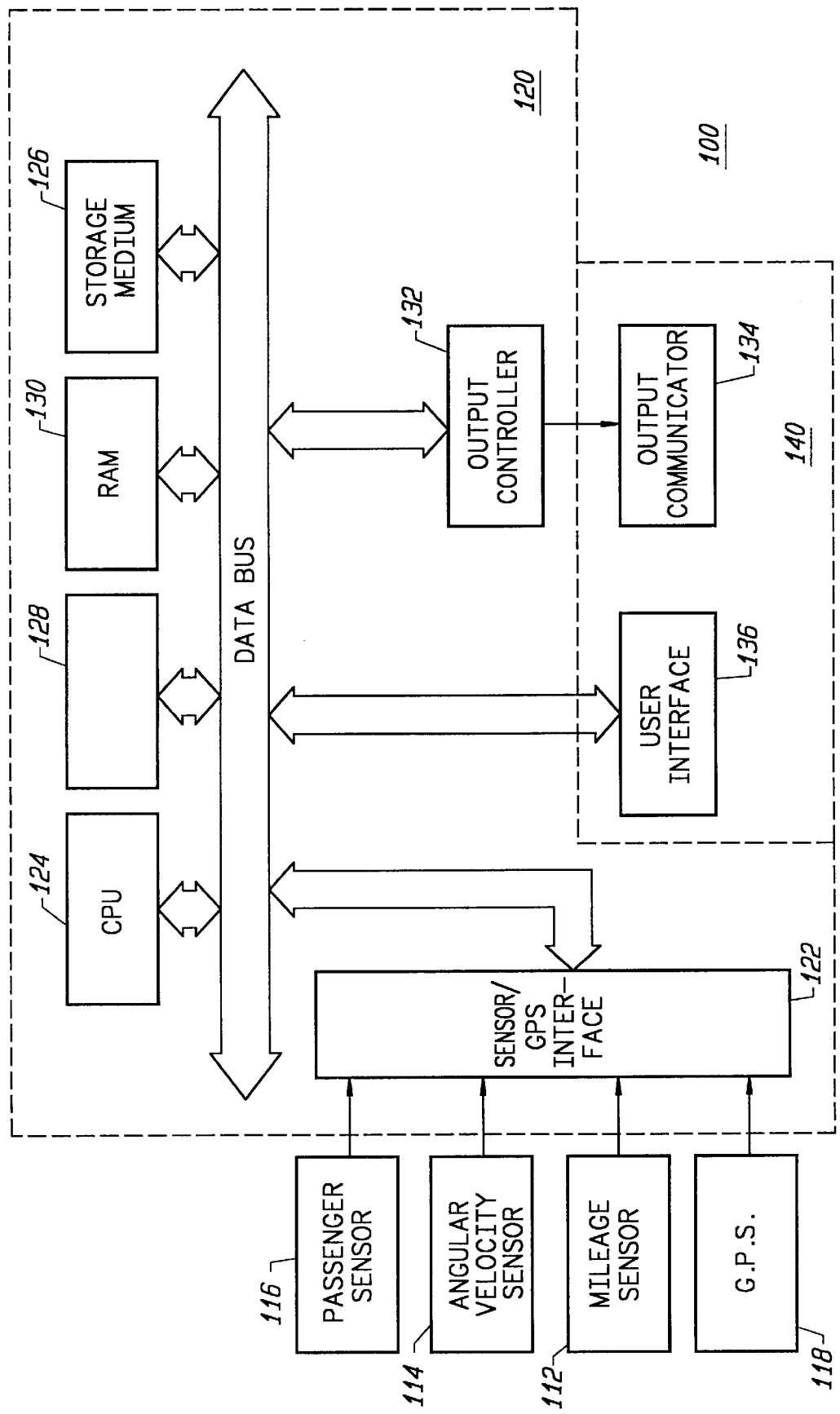
FIG. 1 is a block diagram of a vehicle navigation system for use with the present invention.

FIG. 1 is a block diagram of a specific embodiment of a vehicle navigation system 100 for use with the present invention. Sensors 112, 114 and 116 and GPS receiver 118 are coupled to computing means 120 through sensor/GPS interface 122. In typical embodiments, mileage sensor 112 comprises an odometer, and angular velocity sensor 114 comprises a gyroscope, or a differential odometer coupled to the wheels of the vehicle. Sensor 116 is a passenger sensor which indicates the presence of a passenger. Such a sensor may, for example, make use of existing seat belt sensing electronics. A global positioning system (GPS) data receiver 118 is provided for receiving signals from, for example, a satellite-based navigation system. Data from sensor/GPS interface 122 is transmitted to CPU 124, which performs calibration, signal processing, dead-reckoning, vehicle positioning, and route guidance functions. A database containing map information may be stored in database medium 126, with software directing the operation of computing means 120 stored in main memory 128 for execution by CPU 124. Memory 128 may comprise read-only memory (ROM), or reprogrammable non-volatile memory such as flash memory or SRAM. System RAM 130 permits reading and writing of the information necessary to execute such software programs. Database medium 126 may comprise non-volatile memory, a hard disk drive, CD-ROM, or an integrated circuit in which digitized map information has been stored. Output controller 132, which may comprise a graphics controller, receives data processed by CPU 124 and transmits the data to display console 140 which includes output communicator 134, usually comprising a display screen with associated audio electronics and audio speakers. The driver may input data, such as a desired destination, through user interface 136, typically comprising a keyboard.

The map database stored in database medium 126 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a link class which relates to the category or type of the road. For example, the highest level category of the hierarchy is the link class FREEWAY. The lowest level includes the link classes FRONTAGE and MISC which include, for example, frontage roads and alleys.

The vehicle navigation system of the present invention is operable to generate a route from a source location to a destination according to a variety of different methods. Some examples of such methods are described in the U.S. patents which are incorporated by reference into the present specification above.

Figure 2:
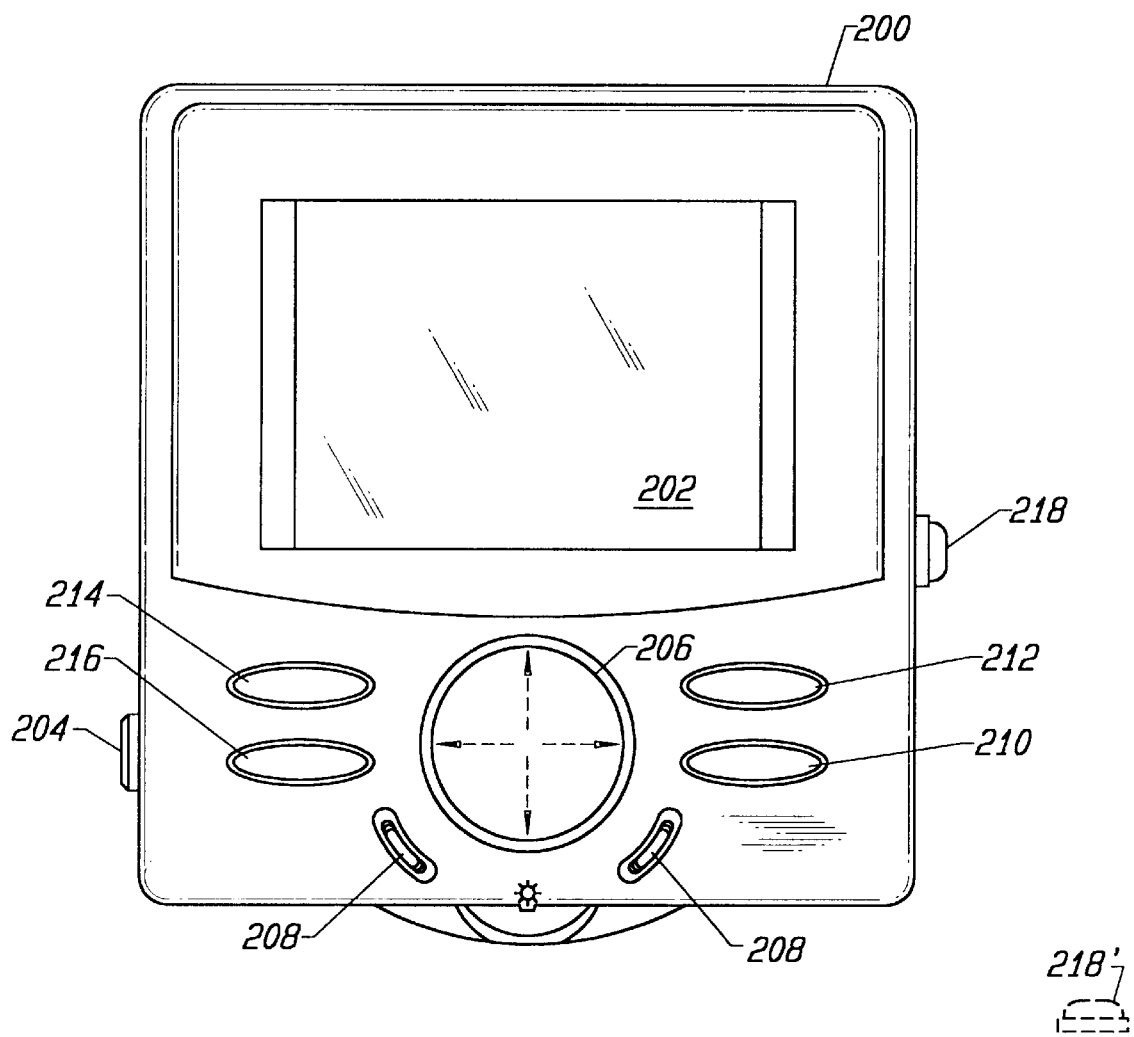
FIG. 2 is an illustration of a specific embodiment of the present invention.

FIG. 2 is an illustration of a vehicle navigation system display console 200 designed according to the present invention. Console 200 has a display screen 202, a power switch 204, and function keys (i.e., control devices) 206–216. A scrolling key 206 is centrally located below display screen 202 with two "Quick Scroll" keys 208 adjacent scrolling key 206 to its left and right. Scrolling key 206 controls the position of a cursor on display screen 202 during destination selection. "Quick Scroll" keys 208 both perform the same function which is to increase the speed with which scrolling key 206 scrolls through destination options on display screen 202. Enter key 210 allows the user of the vehicle navigation system to enter the destination option currently highlighted by the cursor. Cancel key 212 allows the user to cancel the current operation and return to the previous step. Thus, if an incorrect destination is entered with enter key 210, cancel key 212 can be used to immediately correct the error. Route/Map key 214 allows the user to switch between two different route guidance modes. Option key 216 allows the user to reconfigure various features of the system set up.

Display console 200 also includes passenger access key 218 located on the side of console 200 away from the driver. While the vehicle is moving, passenger access key 218 must be activated, i.e., depressed, to enable function keys 206–216. According to specific embodiments, passenger access key must be continuously depressed while function keys 206–216 are used. The passenger access device may alternatively be located remotely from console 200 as indicated by the dashed outline 218'. The positioning of remote passenger access key 218' should be such that it is easily used by someone in the passenger seat, but is substantially inaccessible to the driver.

Figure 3:
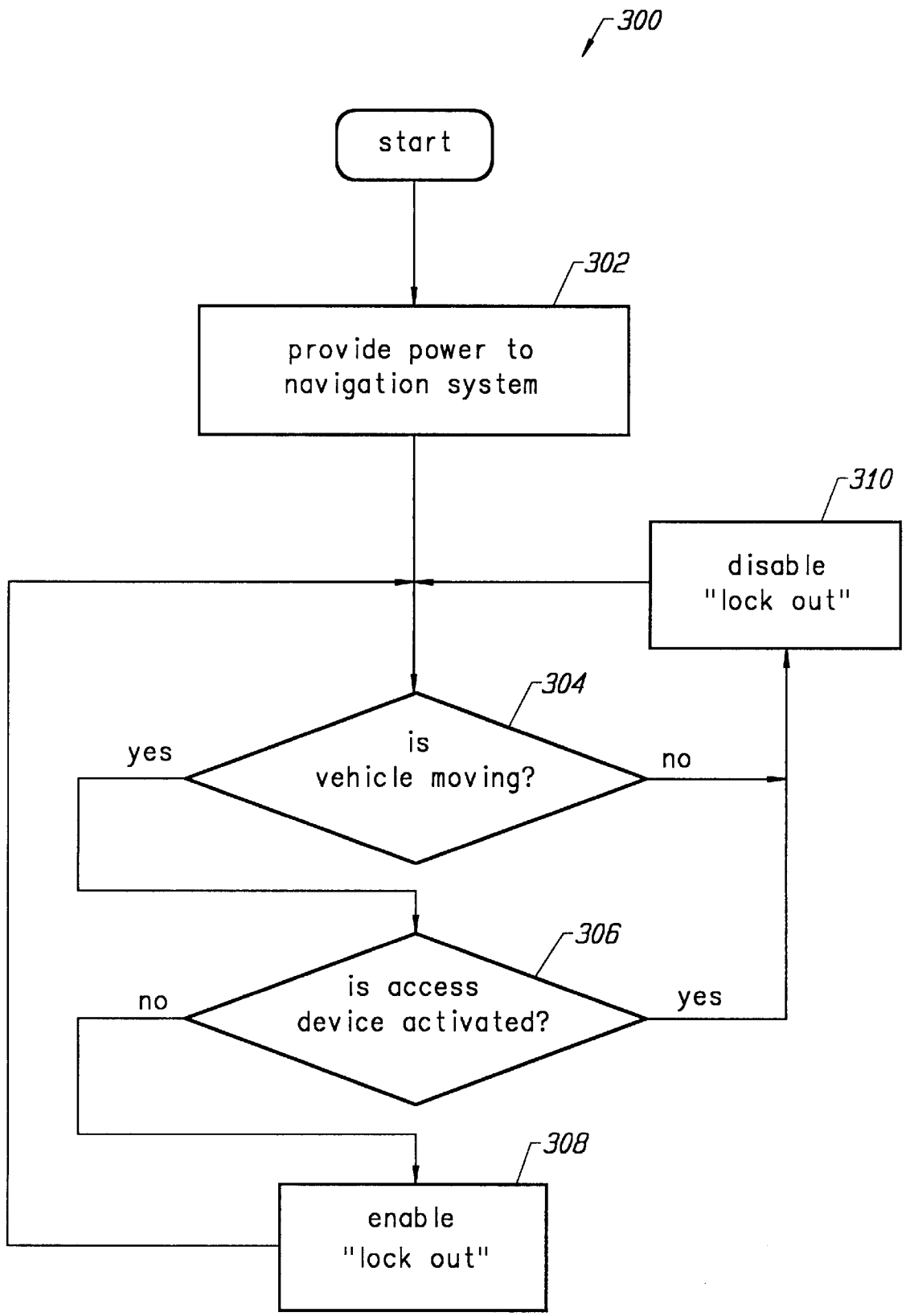
FIG. 3 is a flowchart which illustrates the operation of a specific embodiment of the invention.

FIG. 3 is a flowchart 300 illustrating the operation of a specific embodiment of the invention. After power is provided to the system (step 302), the system determines whether or not the vehicle is moving (step 304). If the vehicle is moving the system determines whether the passenger access device has been activated (step 306). If the passenger access device has not been activated, the "lock out" feature is enabled (step 308) thereby preventing user interaction with the system via the function keys on the display console. If, however, the passenger access device has been activated, the "lock out" feature is disabled (step 310). Likewise, if the vehicle is not moving, the "lock out" feature is also disabled.

It will be understood that the "lock out" feature may be implemented in a variety of ways and still be compatible with the present invention. For example, one type of "lock out" feature might physically or electrically disable the keypad of the display console. Another might employ a software routine which causes the system processor to ignore signals from the keypad. Whatever the implementation, the access device of the present invention may be employed to allow a passenger to circumvent the "lock out".

In addition, while the embodiments described with reference to FIG. 2 show a system in which the function keys, i.e., control devices, are integrated within a housing with the display, it will be understood that these function keys may also be remotely located from the display and/or the navigation system. That is, for example, the function keys may be located in a remote control device which communicates with the system via infrared light.

While the invention has been particularly shown and described with reference to specific embodiments thereof, it will be understood by those skilled in the art that the foregoing and other changes in the form and details may be made therein without departing from the spirit or scope of the invention. For example, the present invention has been described primarily with regard to a vehicle navigation system, but it will be understood that the invention may easily be applied to other products which are used in the automotive environment. That is, safety concerns similar to those described above are presented by a variety of other consumer electronics used by drivers such as cellular phones and a variety of information related products which are becoming available. The present invention may be employed with any such products to enable use of the products while the vehicle is moving without endangering the occupants of the vehicle or others. The scope of the invention should therefore be determined by reference to the appended claims.

What is claimed is:

1. A method for providing access to an interactive product to a passenger of a vehicle while limiting access to the interactive product by a driver of the vehicle, the method comprising the steps of:

providing at least one control device for allowing user interaction with the interactive product;

inhibiting interaction with the interactive product via the at least one control device while the vehicle is moving;

providing an access device within reach of the passenger and substantially inoperable by the driver which must be employed in conjunction with the at least one control device to enable the passenger to interact with the interactive product while the vehicle is moving; and allowing the passenger to interact with the interactive product via the at least one control device while the vehicle is moving in response to activation of the access device.

2. The method of claim 1 wherein the access device is substantially inaccessible to the driver.

3. The method of claim 1 wherein the allowing step allows interaction with the interactive product while the vehicle is moving when the access device is continuously activated.

4. The method of claim 1 wherein the access device comprises a sensor which senses whether the passenger is occupying a passenger seat, the allowing step comprising allowing interaction with the interactive product while the vehicle is moving when the sensor indicates that the passenger is occupying the passenger seat.

5. An interactive product for use in a vehicle which provides access to a passenger of the vehicle while limiting access by a driver of the vehicle, comprising:

at least one control device integrated with the housing for allowing user interaction with the interactive product;

means for inhibiting interaction with the interactive product via the at least one control device while the vehicle is moving; and an access device within reach of the passenger and substantially inoperable by the driver and which must be employed in conjunction with the at least one control device to enable the passenger to interact with the interactive product while the vehicle is moving.

6. The interactive product of claim 5 wherein the at least one control device and the access device are integrated within a housing.

7. The interactive product of claim 5 wherein the access device must be continuously activated to enable user interaction with the interactive product while the vehicle is moving.

8. The interactive product of claim 5 wherein the access device is located remotely from the at least one control device and substantially inaccessible to the driver.

9. The interactive product of claim 5 wherein the passenger occupies a passenger seat, the access device comprising a sensor which senses whether the passenger is occupying the passenger seat.

10. The interactive product of claim 5 wherein the interactive product comprises a vehicle navigation system.

* * * * *